United States Patent [19]

Janner et al.

[11] 4,025,787
[45] May 24, 1977

[54] SEPARATION OF MIXTURES OF GASEOUS ISOTOPES

[75] Inventors: Karl Janner, Erlangen; Klaus Gregorius, Neunkirchen near Erlangen, both of Germany

[73] Assignee: Kraftwerk Union Aktiengesellschaft, Mulheim (Ruhr), Germany

[22] Filed: June 19, 1975

[21] Appl. No.: 588,183

[30] Foreign Application Priority Data

June 24, 1974 Germany .......................... 2430315

[52] U.S. Cl. .............................................. 250/251
[51] Int. Cl.$^2$ ......................................... H01J 39/34
[58] Field of Search .......... 250/251, 281, 282, 283, 250/284

[56] References Cited

UNITED STATES PATENTS

| | | | |
|---|---|---|---|
| 3,532,879 | 10/1970 | Braunstein | 250/251 |
| 3,558,877 | 1/1971 | Pressman | 250/251 |
| 3,778,612 | 12/1973 | Ashkin | 250/251 |

*Primary Examiner*—Craig E. Church
*Attorney, Agent, or Firm*—Kenyon & Kenyon Reilly Carr & Chapin

[57] ABSTRACT

A standing electromagnetic wave having nodes, penetrates through a gaseous jet of the mixture of the isotopes to be separated, while relative motion takes place between the wave and mixture in such a manner that the isotopes are prevented from dwelling in the vicinity of the wave nodes while the isotopes are traversed by the electromagnetic wave. By adjusting the frequency of the electromagnetic wave so that the individual isotopes of the mixture are selectively influenced differently as far as their dipole behavior is concerned, they can be segregated by the electric and/or magnetic field of the wave. Undesirable effects of such dwelling can also be reduced by the angularity at which the wave penetrates the gaseous jet.

11 Claims, 17 Drawing Figures

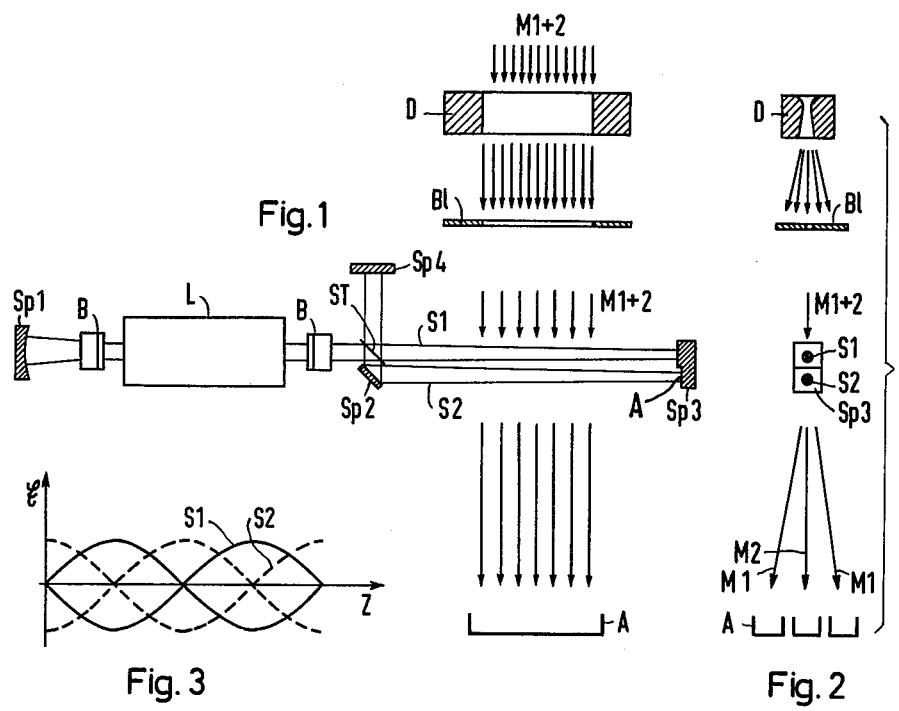
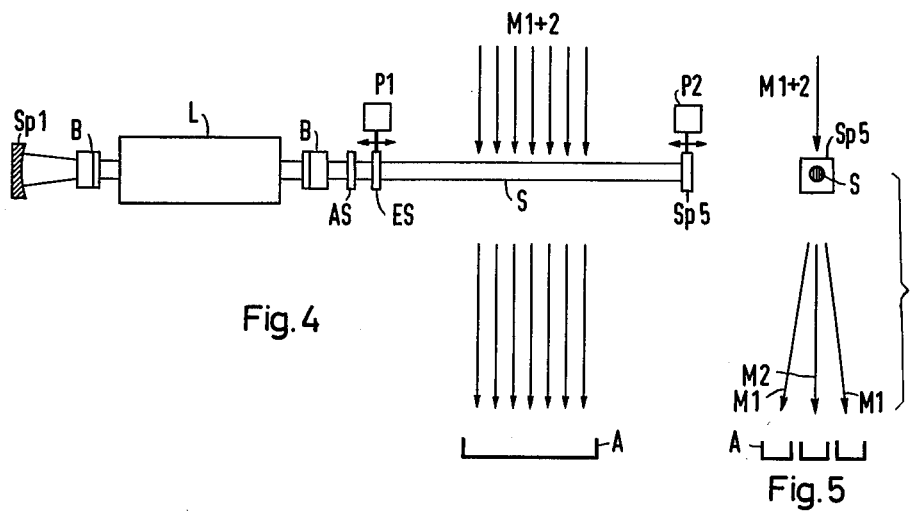

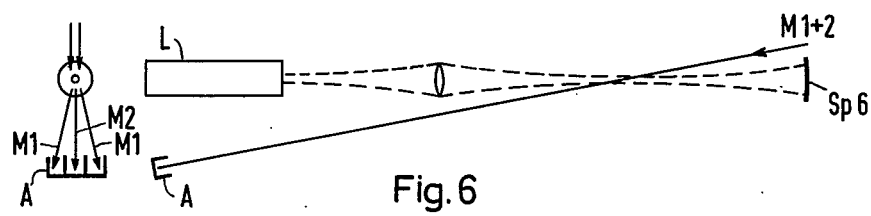
Fig. 7
Fig. 6
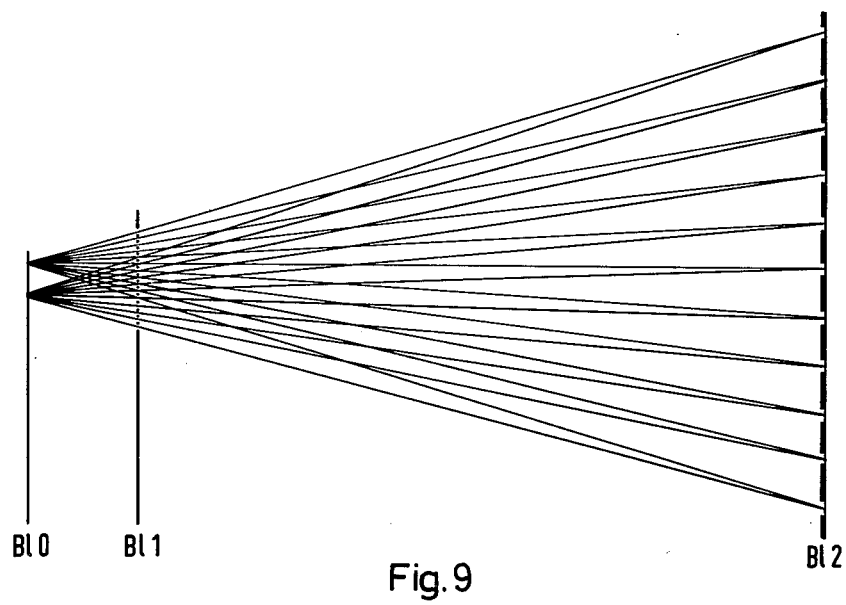
Fig. 9
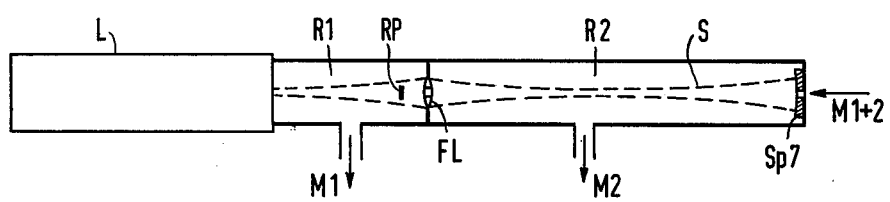
Fig. 10

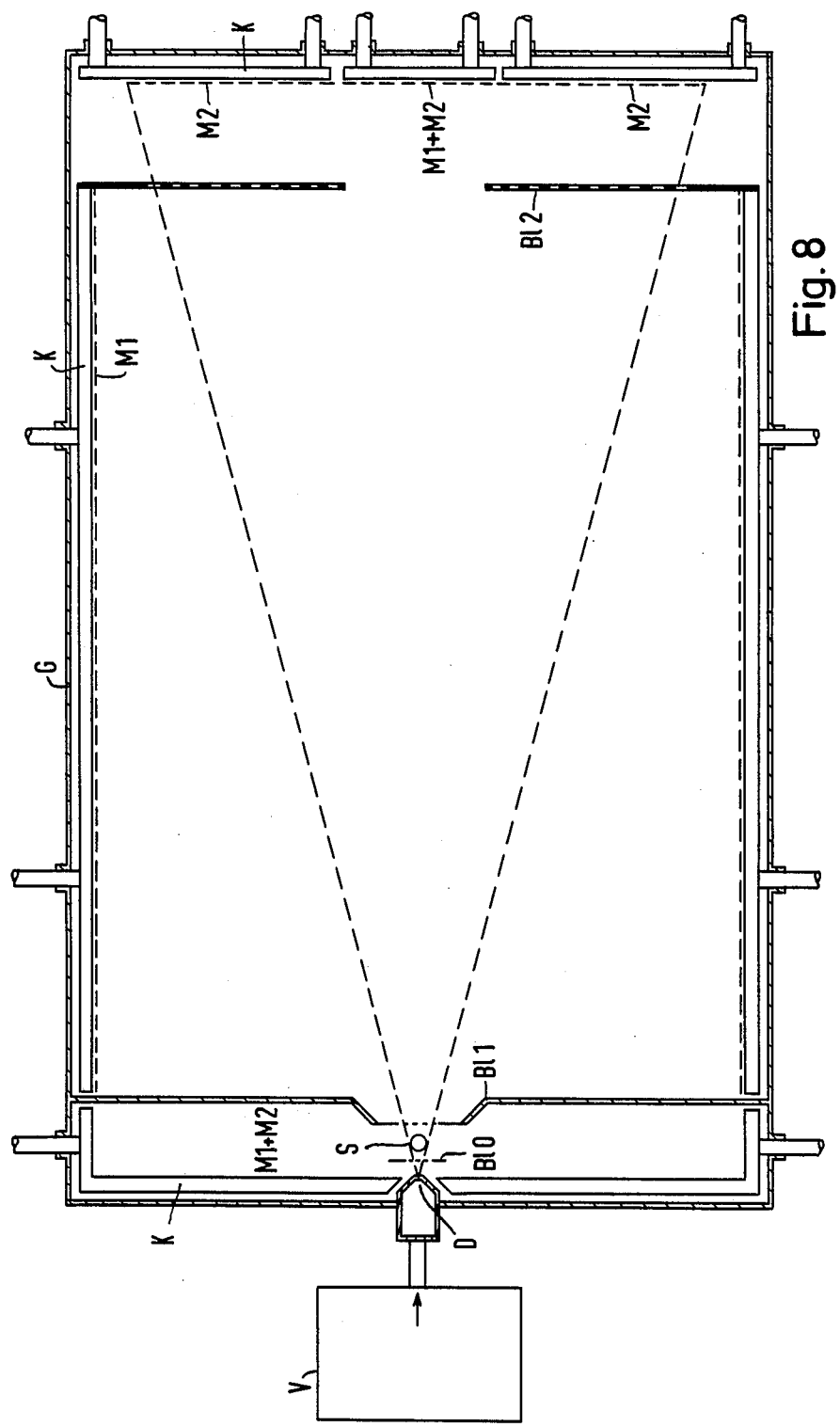

SEPARATION OF MIXTURES OF GASEOUS ISOTOPES

BACKGROUND OF THE INVENTION

The present invention concerns a method and apparatus for physically separating gaseous mixtures of matter, particularly isotopes, wherein at least one beam of a polarized electromagnetic wave is directed through such a mixture and the frequency or wave length, of the electromagnetic wave is adjusted so that the dipole behavior of the individual components of the mixture, is selectively and differently influenced and the isotopes are segregated by the electric and/or magnetic field of the beam. As it does also in other separating methods, the problem arises here to increase the separating performance or the throughput and to optimize them with respect to the power to be supplied, a laser normally being used to provide the wave or beam.

SUMMARY OF THE INVENTION

According to this invention, the beam of the polarized wave, by means of a resonator system, forms a standing wave which is traversed by a flow of the mixture of isotopes to be separated, and the standing wave is moved and/or the flow of the mixture of substances is directed so that relative motion takes place between the standing wave and the flow of the mixture of isotopes in such a manner that the isotopes are prevented from dwelling in the vicinity of the nodes of the standing wave while being traversed by the electromagnetic wave, e.g., a laser beam. By thus increasing the effective energy density in the resonator system, a considerably better utilization of the energy contained in the electromagnetic wave is achieved.

Further improvement can be obtained by dividing the standing polarized wave, by means of a mirror system, into partically parallel wave trains which are displaced against each other in the direction of the beam by about one-quarter wave length. Thereby, a more uniform deflection of the isotopes over the entire beam length is achieved. In addition, the cross section of the electromagnetic radiation is also increased, which is equivalent to lengthening the mean dwelling time of the isotopes to be influenced within the electromagnetic field of beam.

With regard to the physical relations which come to bear for this separating method, it is important, if the separation is effected by deflection of the isotopes by the electric field, that the strength of the electric field, referred to the cross section of the beam, does not have the same value everywhere but exhibits a gradient in or against the direction of the field. The two poles of the molecular dipole of the mixture's components, are thereby exposed to different field strengths, so that an electric force acts on every molecular dipole. The vibration amplitudes of the molecular dipole are here a maximum if the exciting frequency of the electromagnetic oscillation corresponds to the resonance frequency. However, there is a phase difference between the exciting a-c field and the vibration of the molecule, which approaches 180° with increasing frequency if the frequency of the exciting field is slightly higher than the resonance frequency of the molecule involved. With decreasing frequency, this phase difference approaches the value zero, if the frequency of the exciting field is lower than the resonance frequency of the molecule.

In the mixture of matter to be separated, it is to be understod that at least two kinds of molecules with somewhat different resonance frequencies are involved. If the exciting frequency lies here between these two resonance frequencies, the one molecule vibrates nearly in phase and the other, nearly in phase opposite to the exciting field, which means that the two kinds of molecules are deflected in an inhomogeneous field in opposite directions permitting their segregation from each other.

According to the present invention, the beam of the polarized wave if formed by means of the resonator system, a technique known per se, and a standing wave is traversed by the flow of the gaseous mixture of isotopes to be separated. In a standing wave, however, there are wave nodes at which the field strength and therefore, the separating effect, is zero. However, this disadvantage of the standing wave is compensated by the provision that between the standing wave and the flow of the mixture of isotopes, such a relative motion takes place that the isotopes are prevented from dwelling in the vicinity of the wave nodes while traversing the electromagnetic waves. In this manner, the advantage of the standing wave, such as its higher energy density, is practically completely preserved without the occurrence of ineffective regions.

The separation of isotopes is of considerable importance today. However, other substances are also capable of being excited by a polarized electromagnetic wave and can be segregated or separated from each other by the forces of the wave or laser beam and can be considered to be equivalents of isotopes.

BRIEF DESCRIPTION OF THE DRAWINGS

The accompanying drawings schematically illustrate the principles of the present invention, the various figures being as follows:

FIG. 1 is a longitudinal section of an apparatus for separating gaseous mixtures of isotopes, for example;

FIG. 2 is a cross section of the apparatus;

FIG. 3 graphically shows the field strength of the electromagnetic wave;

FIG. 4 is like FIG. 1, but shows a second example;

FIG. 5 is a cross section of FIG. 4;

FIG. 6 is like FIG. 1 but shows a third example of the apparatus;

FIG. 7 is a cross section of FIG. 6;

FIG. 8 is a longitudinal section showing the details required for a complete apparatus using the principles illustrated by the preceding figures;

FIG. 9 shows the pattern of the jets of the gaseous mixtures of isotopes, involved by the example shown by FIG. 8;

FIG. 10 in longitudinal section shows still another example;

DETAILED DESCRIPTION OF THE INVENTION

Figure 11:
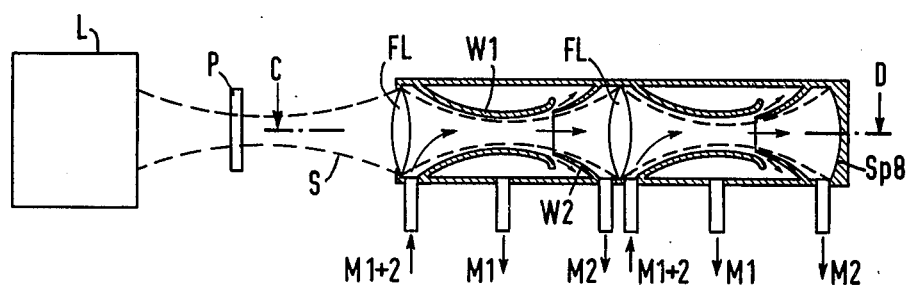
FIG. 11 in longitudinal section provides another example.

The example shown in FIGS. 1 to 3 illustrates the principles of a separating apparatus, in which a gas jet of a gaseous mixture traverses successively two standing waves which are displaced relative to each other by ¼λ. The electomagnetic waves are linearly polarized in such a manner that the vector of the electric field is essentially perpendicular to the direction of propagation of the gas jet. Due to the displacement in space of the two standing waves, a molecule which has traversed the first beam at a node and has therefore not been exposed to a deflection impulse, hits an antinode in the second beam. Thus, the deflection becomes considerably more uniform. FIG. 1 shows a longitudinal cross section through such an apparatus. The active laser zone is designated with L; the laser beam emerges on both sides via the Brewster windows B and remains in a resonance system which consists essentially of the mirrors SP1 and SP3. Part of the laser beam is reflected via a beam divider ST toward the mirror SP2 and from there is thrown again onto the mirror SP3. The latter also forms a resonance system and a standing wave S2 of its own. The latter, however, is displaced in the axial direction relative to the standing wave S1 by a step A in the mirror SP3, so that the shape of the field strength shown in FIG. 3 results in the z-direction (optical axis). The height of the step of the mirror SP3 must therefore be about $\lambda/4$ or $(n \cdot \lambda + \lambda/4)$. In order to avoid the losses at the beam divider ST of the backward wave, these components are reflected back by the mirror SP4 with the correct phase. The necessary fine adjustment of the mirrors and the radiators of the beams divider is carried out in a manner known per se, e.g., by means of piezo-ceramic devices.

The gas jet, which consists of a mixture of the two substances M1 and M2 to be separated, first goes through the orifice D, then through a diaphragm BL and is thereupon deflected in the laser beam selectively in accordance with the resonances of the components M1 and M2, so that they can be separately collected in the collector A. FIG. 2 shows a cross section through the apparatus of FIG. 1.

In FIG. 4, a further example of implementing the principles of the invention is shown. Here, the laser beam coming from the laser zone L is introduced into the resonator via the output mirror AS. The resonator consists of the input mirror ES and the mirror SP5. The input mirror ES and the mirror SP5 are connected here with motion mechanisms P1 and P2, for instance, of an electrical type, which permit the resonator and therefore, the standing wave, to oscillate in the axial direction. The gas jet comes from an orifice, as in the previous example, and the separated components are collected separately in the collector A. FIG. 5 shows a cross section of the apparatus shown in FIG. 4. The velocity generated by the motion mechanisms P1 and P2, which is superimposed on the standing wave, is here chosen so that particles of the gas jet are subjected everywhere to about the same deflection after passing through the wave, but that is not so large, on the other hand, that the Doppler effect and the frequency shift accompanying it becomes excessive as far as the separating effect is concerned. For instance, if the gas jet traverses a standing wave of $\lambda = 16$ μm with a velocity of 100 m per second over a distance of 0.1 cm, synchronous vibration of the input mirror ES and the mirror SP5 with a frequency of 100 kHz and an amplitude of $\lambda/4 = 4$ μm is sufficient. It is possible to leave out the input and output mirror, but then the mirrors SP1 and SP5 must vibrate synchronously.

In the two examples mentioned, the direction of the gas jet of the substances to be separated is essentially parallel to the nodal planes of the standing wave. The nodal planes are those imagined planes which extend perpendicularly to the direction of propagation of the laser beam through the nodal points of the same. If the gas jet now enters at an angle to these planes, but at the same time perpendicularly to the direction of polarization into the laser beam and through the latter, it can thereby be achieved also that every gas molecule passes at least once through the field strength zones from zero to maximum, depending on the incidence angle. Without the measures taken in the examples 1 and 2 and with the gas jet parallel to the nodal planes, no deflection of the particles occurs at the latter and maximum deflection at the antinodes. The deflection of all gas molecules or atoms becomes more uniform with oblique incidence. In addition, the dwelling time is increased with increasing angle of incidence, which results in a correspondingly greater deflection. The effective frequency which acts here on the molecules, differs slightly from the laser frequency. The difference between the two increases with increasing angle of incidence and increasing velocity of the molecules. The laser frequency itself can then also be changed by this amount, which is practically equivalent to the possibility of tuning the required frequencies.

In FIGS. 6 and 7, such a case is depicted schematically. The resonance system consists again of the laser L and the mirror SP6. The gas jet M1 plus M2 traverses the laser beam at a low angle. The electric vector of the linearly polarized wave of the laser beam is here normal to the plane defined by the optical axis and the incident gas jet. The deflection is then in or against the direction of the electric field. Thus, the dwelling time of the particles to be separated in the standing wave and, therefore, the effect, is considerably greater than in the case of incidence perpendicular to the optical axis. However, the useful gas jet cross section is diminished as compared to the first-named examples.

The variants of the method shown schematically in FIGS. 1 to 7 relate to the correlation of laser beams and the mixtures of the substances to be separated. Apparatus for implementing these variants of the method is shown in FIG. 8 where, however, the laser arrangement proper with the mirror systems etc. is left out. In this figure, only the treatment vessel for carrying out the separating process proper is shown. Through design measures regarding the direction of the gas jet, i.e., the mixture of substances, such as isotopes, M1 + M2, a substantial increase in the separation rate is achieved here. The laser beam shown in this arrangement can thus consist of two standing waves displaced relative to each other by λ/4; the laser beam can oscillate back and forth in the axial direction; and the gas jets from the orifice may traverse the laser beam also at an angle. In all cases, the direction of polarization and therefore, also the direction of the electric field are perpendicular to the direction of the gas flow.

The treatment chamber consists of a gas-tight housing G, which is provided with a cooling jacket K for adjusting the temperature. It is furthermore connected to a vacuum pump (not shown). It is also equipped with a supply vessel V for the mixture of substances to be separated, which enters in gaseous form through the slit orifice D into the treatment chamber. The emerging gas jet is decompressed in front of the orifice, expanding greatly, until the mean free path has become so long that the gas molecules continue to fly with the velocity prevailing at this point, practically without collision and in a straight line. A grid or array of slits BLO is arranged here, whose slits are parallel to the slit of the orifice D. This slit grid is the origin of a multiplicity of source jets passing through the laser beam S. The bundles of gas jets which emerge from the slit grid BLO and are still relatively strongly divergent are then resolved by the second slit grid BL1, after traversing the laser beam S, into a large number of partly crossing sub-jets, each of less divergence. These molecules then fly, if they do not belong to the deflected kind, through the openings of a diaphragm BL2, which is erected at a fairly large distance, say, 1 m, from the slit grid BL1. It is located, furthermore, just in front of the rear wall of the housing G. The correlation in space between the slit grids BLO and BL1 as well as the diaphragm BL2 is arranged so that the sub-jets starting from the source slits in the slit grid BLO, which are not deflected, go through slits of the grids BL1, BL2. This geometric correlation is shown for two slits of the slit grid CLO in FIG. 9. From this may be seen that the source slits as well as the slits of the slit grids BL1 and BL2 always lie on a straight or almost straight line. The practical effect of this correlation of the different slit grids is now that particles not deflected by the laser beams go through the slit grid BL2 and are collected at the rear wall of the housing G. Deflected particles, on the other hand, will no longer hit the slits of the grid BL2 and are held back by the crossbars of the same. They are then condensed at the walls of the chamber between the slit grid BL1 and the diaphragm BL2. In order to prevent the slits from getting clogged by condensed substance, the grid is kept at so high a temperature that no condensation takes place there. As the field gradient is relatively small in the central zone of the laser beam, no dipoles suitable for the deflection of the particles will form there; separation will therefore not take place. For this reason, the central zone of the slit grid BL2 is open, as shown in FIG. 8; at the rear wall of the housing G, part of the mixture of the substances collects in this zone in unsegregated condition. This means, if the separation of uranium isotopes, for example, is involved here, that the natural uranium isotope mixture is present in this region. Outside of these zones, the practically uninfluenced uranium isotopes U 238 are precipitated. Depending on the starting material, these isotopes may precipitate in metallic form or also in the form of a compound, such as, for instance, uranium hexafluoride, and obtained in this manner in separated form.

The molecules held back by the grids BLO and BL1 also are not separated. For this reason, these quantities of the substances are collected separately. The gas pressure in the space between the orifice and the grid B1 is kept, either by pumping off or condensing the substance to be separated, at so low a value that the interference background of not separated substance in the space between the grids BL1 and BL2 caused thereby, remains small. Extraneous gases that occur can be removed by a vacuum pump preceded by a cooling trap.

Another possibility for implementing this new separating method is shown in FIG. 10. Here, the resonance system again consists of the laser L and the mirror SP7 as well as a focusing lens LF. The mirror and the focusing lens are provided with a central hole, through which the gas jet can pass. In this example, the jet M1 + 2, enters via a diaphragm-like hole in the mirror SP7 into the treatment chamber and thus traverses the laser beam in the axial direction. However, only the cross section of the laser beam itself can be utilized here for the separation. In this case, the frequency of the standing wave is chosen so that only the molecules of the atom type M2 are deflected strongly, while those of the other type, M1, are deflected only little. This means in the example that the little-influenced particles M1 can enter through a small opening in the lens FL into the plenum R1, while the strongly deflected particles M2 remain in the plenum R2. The particles can then be exhausted from these chambers separately or be condensed on their walls. The optical components such as mirrors, lenses and laser exit windows are protected against vapor deposition by suitably high temperatures, if the vapor pressure of the substances is not too high. If temperatures would have to be used for this purpose at which these components would be damaged, then a plate RP which is transparent for the laser radiation and on which the particles condense, can be arranged in front of the lens in the plenum R1, for instance, for analytical purposes. The plate can be removable, in order to bring the vapor-deposited parts out of the radiation space. The enclosure of the treatment chamber shown here is, of course, also necessary in the previously mentioned examples; it was left out in this case only for the sake of clarity.

Figure 12:
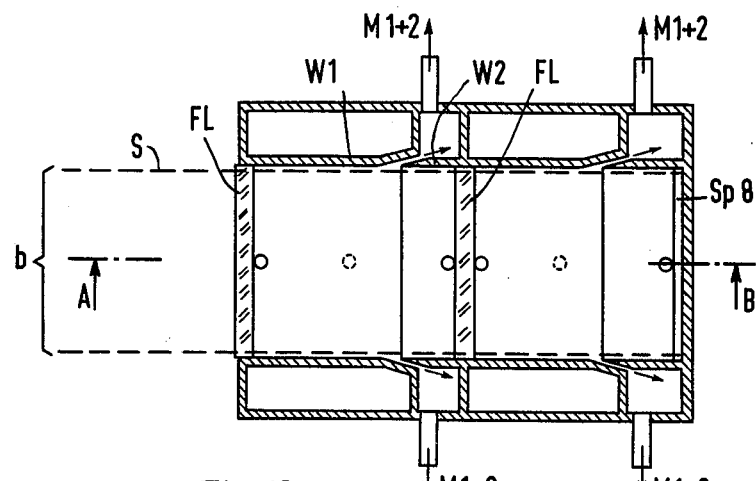
FIG. 12 is a cross section of the apparatus shown by FIG. 11.

A further possibility of separating isotopes by means of the electric field of a standing polarized wave is shown in FIGS. 11 and 12. Here, a polarized standing wave of rectangular cross section is generated in the laser and the polarizing device P, the electric vector being parallel to the plane of the paper in the view of FIG. 11 and perpendicular to the plane of the paper and to the optical axis in the view of FIG. 12. By the optical means known per se, e.g., cylinder lenses and cylindrical mirrors, the height of the wave is greatly constricted at intervals, as shown by the dashed lines in FIG. 11. The gas to be separated, i.e., the mixture M1 + M2, is fed to the standing wave in a region with a large cross section and is then conducted through a wall W1 fitted to the shape of the wave. In the region of the narrow point of the wave, the electric field and its gradient reach such magnitudes in the direction of polarization that particles which oscillate with little phase shift relative to the standing wave, are transported into the region about the center plane, while particles with a phase shift near 180° are urged out of the beam. Behind the separation zone, the gas stream is widened by flaring out the guide walls W1. The core of the gas jet, in which the particle type M2 is enriched, enters the interior of a suitable shaped peeling section W2 projecting into the widened space, whereby the upper and lower edge zone, in which the particle type M1 is enriched, is peeled off. On the narrow sides of the gas jet, the separation effect is small, as there the electric field and its gradient are small. Therefore, these parts of the gas stream, which can be enriched only little, are collected separately. FIG. 12, which shows a horizontal cross section through the apparatus according to FIG. 11, shows these relations. It can also be seen here that the focusing lenses FL are designed as cylinder lenses. As depicted in these two figures, such separating arrangements can also be placed in tandem, but they can also be connected in cascade to steadily increase the degree of enrichment with the one isotope.

This apparatus, shown in FIGS. 11 and 12, may however also be designed with rotational symmetry if one provides that the direction of polarization rotates with a rotation period which is small as compared to the transmit time of the wave in the resonator, but large as compared to the transit time of the gas molecules or atoms in the deflection zone. In this manner, the same force is exerted on the particles in all directions perpendicularly to the optical axis, averaged in time. In this case, the separation point can also be relocated there, if the field strength is sufficiently large, by leaving out the guide wall in the narrowest region of the standing wave, so that the particle type M1 can exit here radially.

The phase shift of 90° between the electric and the magnetic field, which is present in the case of the standing wave, has the effect that forces of the same direction occur at one point, over all times, only if the phase shift between the electric field and the induced dipole moment deviates from 90°. In space, their direction reverses at intervals of $\lambda/4$.

Figure 13:
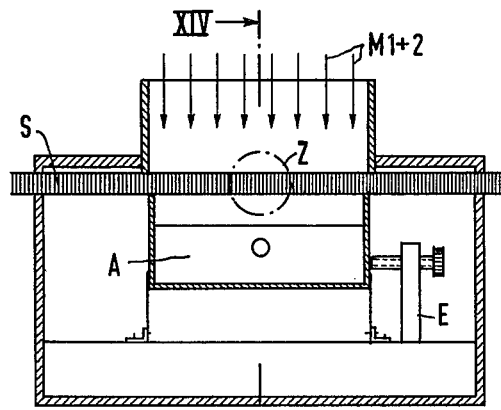
FIG. 13 shows in longitudinal section an apparatus operating on a different principle of segregation or separation than that of the other examples.
Figure 14:
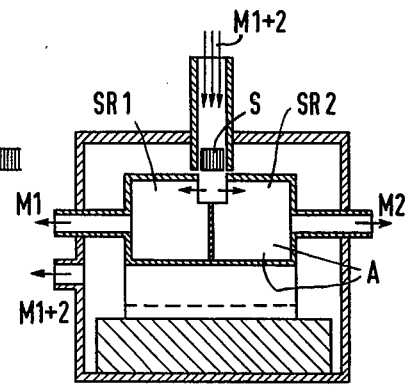
FIG. 14 is a cross section taken on the line XIV—XIV in FIG. 13.
Figure 15:
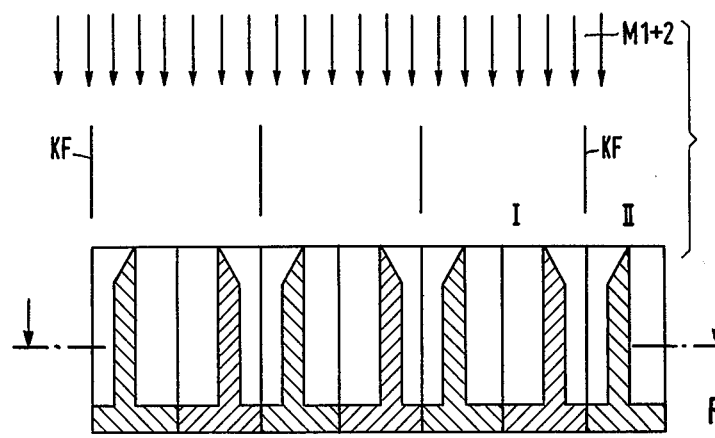
FIG. 15 shows a detail of FIG. 13.
Figure 16:
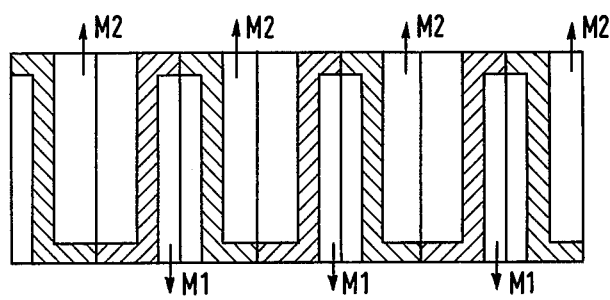
FIG. 16 shows still another detail.
Figure 17:
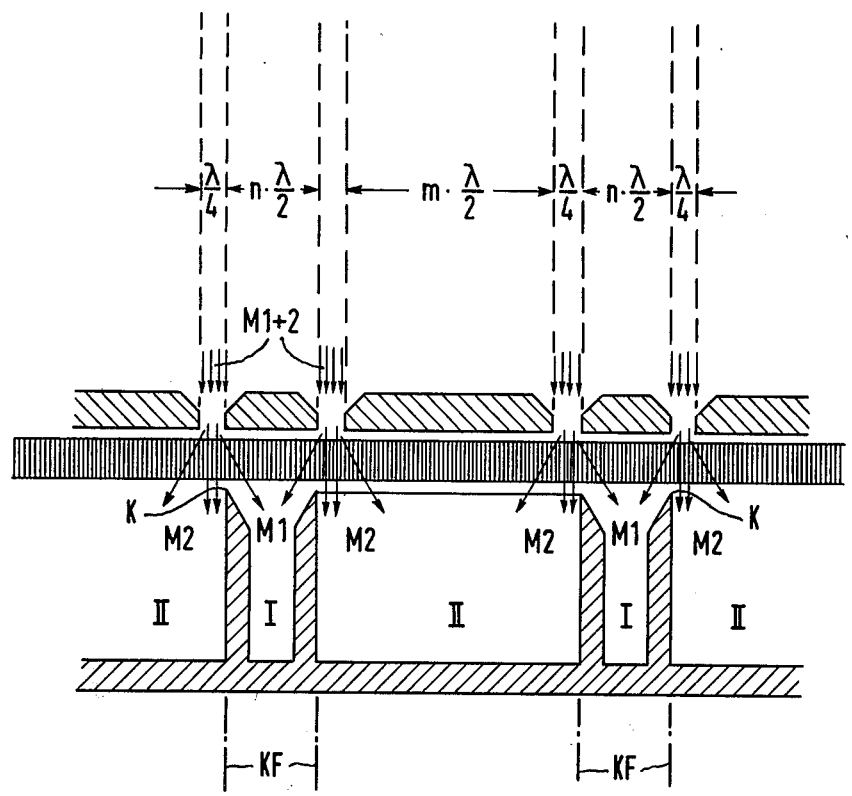
FIG. 17 shows a modified collection system.

FIGS. 13 to 17 show an apparatus for utilizing the magnetic separating effect. If the frequency of the standing wave is chosen so that it coincides with the resonance frequency of one particle type, then these particles are urged toward the node planes K. If the gas stream passes through the standing wave parallel to the node planes, this particle type will be enriched in the region of the nodal plane and can then be suctioned off when leaving the laser beam by a special collector system, separated from those partial gas streams from the antinodes of the wave. FIG. 13 shows a longitudinal section and FIG. 14, a cross section through such an apparatus; FIG. 15 shows detail Z from FIG. 13, while FIG. 16 represents a horizontal cross section through the collector system. The standing wave S traverses, according to FIG. 13, the treatment chamber, which is evacuated of foreign matter, as in the previous examples. The pressure of the mixture of the substances M1 + M2 to be separated at the condensation temperature, can be adjusted, for instance, via the temperature ahead of the orifice, to the desired value. The mixture of the substances then flows through a narrow canal from the top through the standing wave S and arrives at a collecting system A. There, the segregated particle streams M1 and M2 are exhausted laterally, as shown by FIG. 14, and in addition, measures are taken to suction-off that part of the mixture of substances that goes past the collecting device. FIG. 15 shows schematically the arriving particle stream M1 + M2, below it individual nodal planes of the standing wave KF and again below them, the chambers of the collectng system. Under each nodal plane there is arranged a collecting chamber and under each antinode, another collecting chamber, whose outlets open towards different sides, as shown by FIG. 16. These different sides end in the plenums SR1 and SR2, cf. FIG. 14, and are exhausted from there. Such a finely subdivided, thin-walled system of chambers as the collecting device A, in which each pair of chambers has the dimension $\lambda/2$ in the direction of the axis, can be made, for instance, as a stack of similar elements in a common mounting. The matching of this system of chambers requires great accuracy; it can be done, for instance, by an adjusting device E, see FIG. 13. The individual elements are produced, for instance, by lining up the cavities or by evaporating the elevated areas, because of their extraordinary fineness.

With very short resonance wave lengths, the fabrication of such a collection system A according to FIGS. 15 and 16 can become difficult if not impossible. In such cases, but still with infrared radiatiion, it is possible to construct a system according to FIG. 17. Here, the gas enters from the top into the standing wave S through slits about $\lambda/4$ wide. If their nodal planes are located at the separating edges K of the chambers of the collecting system A, the particles that are at resonance are then deflected into the chamber I, while the others flow nearly uninfluenced into the chamber II. They can be drawn off from there separated, as in the examples according to FIGS. 13 to 16. As there, the separation points can be apart by any desired multiple of $\lambda/2$, it is possible to construct the collecting system A with larger chambers and wall thicknesses. With this design, it would also be possible to readjust the distance of the individual chambers I and II from each other and to thereby match them to the wave length of the laser beam or the spacing of the wave nodes.

The improvements described herein as well as the apparatus mentioned by way of example for implementing the same, are not only accompanied by an increased separation rate per unit time, but they also allow a considerably better utilization of the laser energy through the use of the resonance principle. Thus, there is a further increase in the efficiency over the known isotope separation methods such as are used particularly for the separation of uranium isotopes.

What is claimed is:
1. A method for separating a gaseous mixture of molecules having different resonances comprising:
   a. forming a polarized standing electromagnetic wave beam having nodes and a frequency causing deflection of the molecules in different directions relative to each other;
   b. flowing the mixture through said beam; and
   c. dividing said beam by reflection into two substantially parallel wave trains which are displaced in phase by about one-quarter of their wave length so as to prevent the molecules from dwelling at the beam's nodes, whereby said molecules will be separated by deflection in different directions relative to each other.

2. A method for physically separating a flowing mixture comprising the steps of:
   a. generating a standing wave beam of electromagnetic energy at a frequency near the resonance frequency of at least one of the components of the mixture to be separated;
   b. polarizing said beam;
   c. flowing the mixture to be separated through said beam coaxially therewith whereby said polarized beam will set up dipoles in the component having a resonance frequency near that of said beam thereby causing said component to be deflected transversely with respect to the axis common to said beam and the flow of said mixture; and
   d. collecting the deflected components at pickup points distributed transversely with respect to said common axis.

3. A method for physically separating a flowing mixture comprising the steps of:
   a. generating a standing beam of electromagnetic energy at a frequency near the resonance frequency of at least one of the components of the mixture to be separated, said beam having at least one antinode and two nodes;

b. polarizing said beam;

c. passing the mixture to be separated transversely through said beam whereby said polarized beam will set up dipoles in the component having a resonance frequency near that of said beam thereby causing said component to be deflected; and d. collecting the deflected components at pickup points located respectively in the region of said nodes and said antinode.

4. A separator for separating a gaseous mixture of molecules, comprising a supply vessel for the mixture to be separated and which is provided with a slit orifice, a separation chamber to which the slit orifice is connected, and which is adjustable as to vacuum and cooling; a slit grid arranged in front of the slit orifice with a multiplicity of slits parallel to the slit orifice for dividing a jet of the mixture of substances from the slit orifice into a multiplicity of individual jets; means for forming an electromagnetic wave beam of a wave length tuned to a resonance frequency of one type of molecule in said mixture which beam is arranged to form polarized standing waves extending along an optical axis traversing the multiplicity of jets of the mixtures of substances in front of the slit grid in their entire width; a further slit grid, a partition for the separation chamber in which the further slit grid is arranged, a grid with many slits, the chamber having a collecting wall in front of which the grid with the many slits is arranged, all slits of all the slit grids being placed so that they lie on straight connecting lines.

5. The apparatus of claim 4 in which a laser device is built on the separator chamber and the chamber has means by which is kept at appropriate temperatures and pressure; means being provided so that the mixture of substances is fed-in in the optical axis of the system and the chamber is partitioned off by an optically transparent diaphragm or lens for holding back the particles deflected by the electric field; and subchambers are provided for collection of the components of the mixture of substances.

6. A method for physically separating a flowing mixture comprising the steps of:

a. generating a standing wave beam of electromagnetic energy at a frequency near the resonance frequency of at least one of the components of the mixture to be separated;

b. polarizing said beam;

c. passing the mixture to be separated through said beam whereby said polarized beam will set up dipoles in the component having a resonance frequency near that of said beam thereby causing said component to be deflected transversely with respect to a plane which contains the longitudinal direction of said beam and the flow of said mixture; and d. collecting the deflected components at pickup points distributed transversely with respect to the longitudinal direction of said beam.

7. Method according to claim 6 in which the polarized standing wave is divided by a system of mirrors into two practically parallel wave trains which are displaced relative to each other in the direction of the optical axis by about one-quarter of a wave length.

8. Method according to claim 6 in which the standing wave is traversed by the flow of the mixture of substances at an angle in such a manner that the substance particles are influenced successively by different amplitude regions of the standing wave.

9. The method according to claim 6 and further including the step of preventing the components of said mixture from dwelling at the nodes of said standing wave.

10. The method according to claim 9 wherein said step of preventing comprises causing relative motion between said beam and said mixture.

11. The method of claim 9 wherein said step of preventing comprising adjusting the angle between the flow of said mixture and said beam.

* * * * *